(12) United States Patent
Baker et al.

(10) Patent No.: US 8,678,169 B2
(45) Date of Patent: Mar. 25, 2014

(54) CHECKPOINT SYSTEM WITH WHEELED BINS

(75) Inventors: Andrew N. Baker, New Orleans, LA (US); Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 106 days.

(21) Appl. No.: 13/394,290

(22) PCT Filed: Sep. 14, 2010

(86) PCT No.: PCT/US2010/048735
§ 371 (c)(1),
(2), (4) Date: Mar. 5, 2012

(87) PCT Pub. No.: WO2011/037783
PCT Pub. Date: Mar. 31, 2011

(65) Prior Publication Data
US 2012/0160638 A1    Jun. 28, 2012

Related U.S. Application Data

(60) Provisional application No. 61/244,599, filed on Sep. 22, 2009.

(51) Int. Cl.
*B65G 37/00* (2006.01)
(52) U.S. Cl.
USPC .............................. 198/358; 198/795; 378/57
(58) Field of Classification Search
USPC .......... 198/358, 347.1, 580, 348, 349, 369.1, 198/795; 378/57, 58
See application file for complete search history.

(56) References Cited

U.S. PATENT DOCUMENTS

| | | | | |
|---|---|---|---|---|
| 2,717,699 A * | 9/1955 | Spindler et al. | ............... | 198/795 |
| 3,148,783 A | 9/1964 | Michaels | | |
| 3,666,254 A * | 5/1972 | Stanke | ......................... | 198/795 |
| 3,848,726 A * | 11/1974 | Wiemer | ........................ | 198/795 |
| 6,102,194 A * | 8/2000 | Charny | ......................... | 198/795 |
| 7,360,641 B1 | 4/2008 | Fourney | | |
| 7,415,094 B2 * | 8/2008 | Johnson et al. | ................. | 378/57 |
| 7,418,077 B2 * | 8/2008 | Gray | ............................. | 378/57 |
| 7,492,860 B2 * | 2/2009 | Garms et al. | .................... | 378/57 |
| 7,686,154 B2 * | 3/2010 | Henkel et al. | ................ | 198/358 |
| 7,954,627 B2 * | 6/2011 | Weed et al. | ................... | 198/580 |
| 8,351,567 B2 * | 1/2013 | Wuestenbecker et al. | ...... | 378/57 |
| 8,474,595 B2 * | 7/2013 | Crass et al. | ................... | 198/358 |
| 2004/0016623 A1 | 1/2004 | Olson et al. | | |
| 2007/0133743 A1 | 6/2007 | Johnson et al. | | |

* cited by examiner

*Primary Examiner* — James R Bidwell
(74) *Attorney, Agent, or Firm* — James T. Cronvich

(57) ABSTRACT

A checkpoint system, wheeled bins for a checkpoint system, and methods for conveying articles in wheeled bins through a checkpoint system. Each bin has four wheels that do not extend below the bin's flat bottom. In this way, the bin can be slid on its bottom along a shallow, troughed divesting table while it is being filled and conveyed on its bottom through a checkpoint and rolled on its wheels along a deeper troughed discharge lane. A bin return beneath the discharge lane returns bins to a bin storage queue beneath the divesting table. A sorter at the output of the checkpoint selectively diverts bins to one or more discharge lanes, such as individual lanes for cleared and for suspect bin contents.

25 Claims, 4 Drawing Sheets

CHECKPOINT SYSTEM WITH WHEELED BINS

BACKGROUND

The invention relates generally to checkpoint systems, such as airport security systems, and more particularly to checkpoint systems conveying articles to be checked in bins and methods for operating those systems.

Every airline passenger is familiar with airport security checkpoints. The passenger empties his pockets into a plastic bin, drops in his belt and shoes, and adds other items he is carrying. He pushes the loaded bin along a gravity-roller conveyor until the bin reaches a flat conveyor belt, which eventually conveys the bin into an x-ray scanner. After passing successfully through the personnel scanner, the passenger unloads his bin, which has been discharged from the scanner along a declining gravity-roller conveyor. An airport-security worker then collects the unloaded bins, carries them back to a table near the starting point, and stacks them there. If the scanned image of a bin shows suspicious or unidentifiable items, that bin is manually removed from the line of cleared bins and inspected. These manual methods of handling bins are not a productive use of a security worker's time.

SUMMARY

These shortcomings and others are overcome by a checkpoint system embodying features of the invention. In one version of such a checkpoint system, articles to be checked are loaded in bins, each of which has a front panel, a rear panel, a left panel, and a right panel upstanding from a bottom panel. The left, right, front, and rear panels form four side walls that extend from the bottom panel upward to a top rim. At least two wheels extend outward of each of the left and right panels. The peripheries of the wheels do not extend below the bottom side of the bin. The bins, loaded with the articles to be checked, are slid on their bottom panels along a divesting table toward a checkpoint. A checkpoint conveyor conveys the bins received from the divesting table through the checkpoint in a conveying direction. At least one discharge lane receives checked bins from the checkpoint conveyor. A discharge lane comprises a pair of parallel rails along which the wheels on the left and right panels of the bins ride. Another aspect of the invention comprises the bin already described.

Yet another aspect of the invention provides a method for conveying flat-bottomed, wheeled bins to a checkpoint. The method comprises: (a) sliding bins holding article to be checked on the flat bottoms of the bins along a table toward a checkpoint; (b) conveying the bins received from the table through the checkpoint; and (c) rolling the checked bins along a discharge lane formed by rails along which the wheels of the bins ride.

BRIEF DESCRIPTION OF THE DRAWINGS

These features and aspects of the invention, as well as its advantages, are further described in the following description, appended claims, and accompanying drawings, in which:

DETAILED DESCRIPTION

Figure 1:
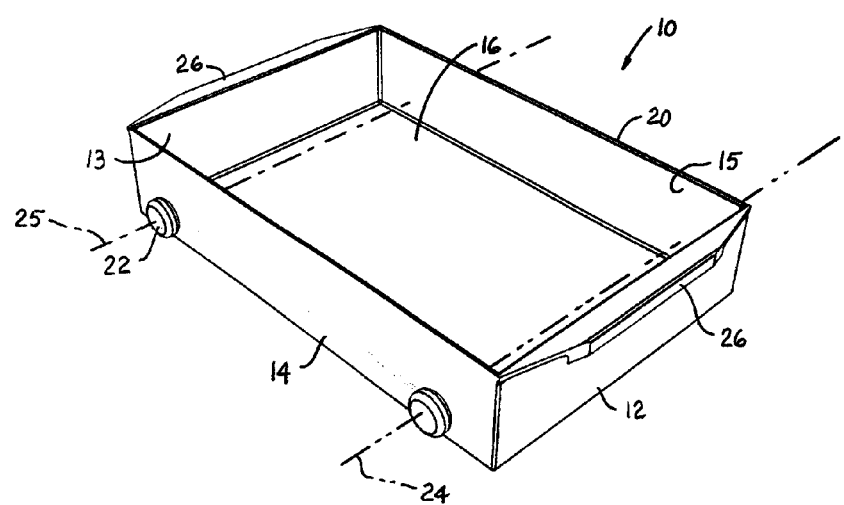
FIG. 1 is a perspective view of a wheeled bin embodying features of the invention.
Figure 2:
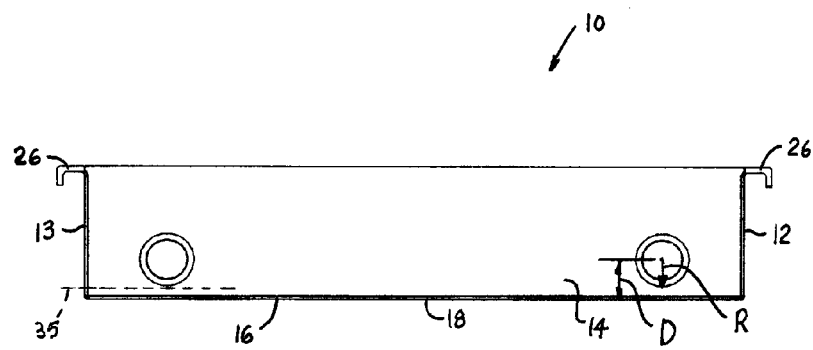
FIG. 2 is a side elevation view of the bin of FIG. 1.
Figures 3, 4:
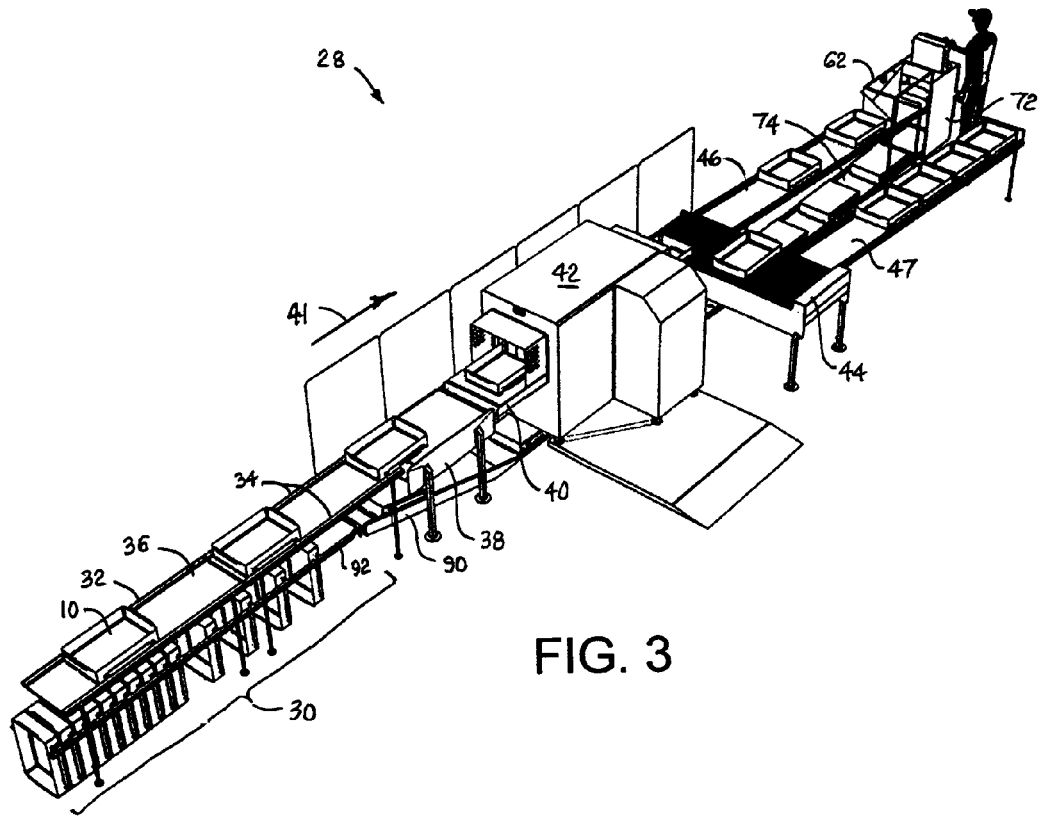
FIG. 3 is a perspective view of a security checkpoint system embodying features of the invention, such as the bin of FIG. 1.
FIG. 4 is a perspective view of a divesting area of the checkpoint system of FIG. 3.
Figure 5:
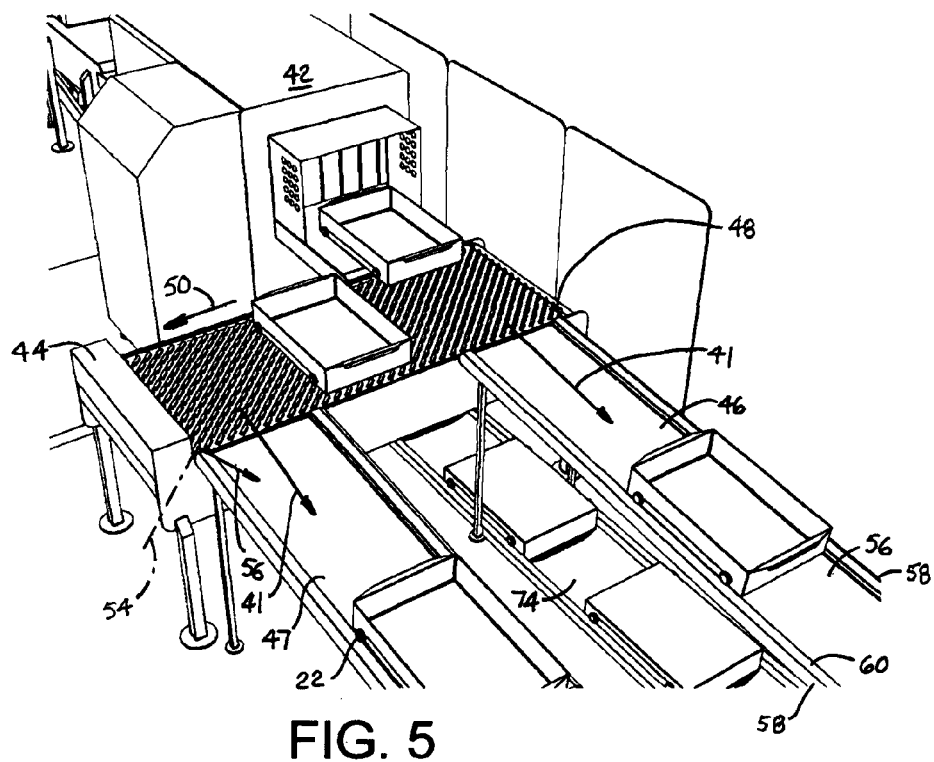
FIG. 5 is a perspective view of a sorter in the checkpoint system of FIG. 3.
Figure 6:
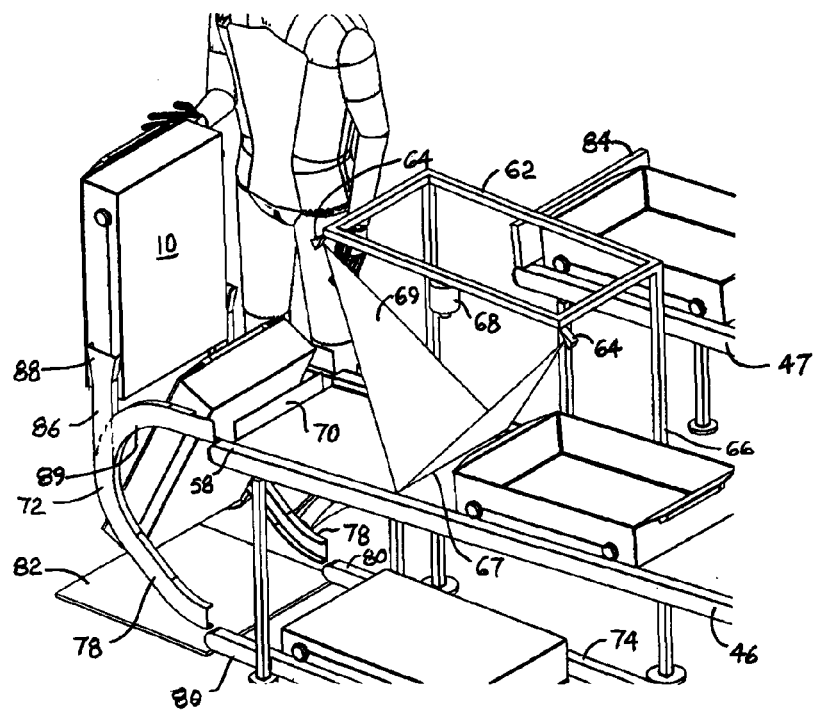
FIG. 6 is a perspective view of a visioning system for detecting loaded scanned bins and of a bin inverter in the checkpoint system of FIG. 3.
Figure 7:
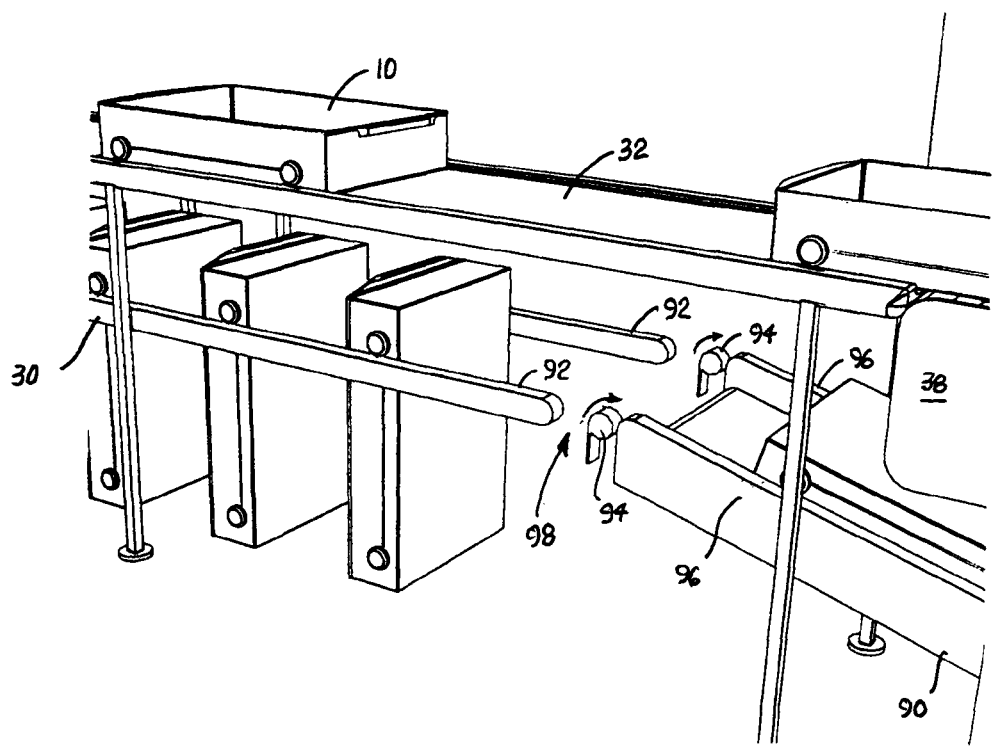
FIG. 7 is a perspective view of the entrance to a vertical bin storage queue in the checkpoint system of FIG. 3.

A bin embodying features of the invention making it useful in a checkpoint system embodying further features of the invention is shown in FIGS. 1 and 2. The bin 10 is an open, generally rectangular parallelepipedic container formed by five panels: a front panel 12, a rear panel 13, a right panel 14, a left panel 15, and a bottom panel 16, which preferably has a flat bottom 18. The front, rear, right, and left panels form side walls upstanding from the bottom panel of the bin out to distal ends defining the bin's top rim 20. The front and rear panels are preferably shorter in length than the right and left panels. Wheels 22 extend outward from the right and left panels 14, 15. The wheels rotate on axes 24, 25 parallel to the bottom panel and generally perpendicular to the right and left panels. The left and right wheels are preferably aligned with each other and closer to the bottom panel 16 than to the top rim 20. More important, the radius R of the wheels does not exceed the distance D of the wheels' axes from the bottom 18 of the bottom panel 16. Handles 26 extend outward from the top rim 20 along the front and rear panels 12, 13. Besides serving their conventional purpose, the handles also act as spacers ensuring a gap between bins accumulated in line. The bins are preferably symmetrical about both their major and minor axes so that that the bins are identical when rotated 180°.

An airport-security scanning system 28 shown in FIGS. 3-7 exemplifies a checkpoint system that uses the bins 10 of FIGS. 1 and 2 and embodies other features of the invention. A passenger first removes a bin 10 from a vertical bin storage queue 30 and places it on a divesting table 32 bottom side down. Then the passenger puts his belongings into the bin. The elongated divesting table 32 has parallel side walls 34 running the length of the table and forming a trough with the table top 36. The side walls are spaced apart across the table top a distance just greater than the length of the front and rear panels 12, 13 of the bins. This ensures that the bins are oriented with the front (or rear) panel leading. The bottoms 18 of the bins rest on the table top 36. The table's side walls 34 are short enough in height that the shallow trough they form with the table top is not deep enough for the bins' wheels 22, elevated as they are slightly above the bottom panel 16, to contact the tops 35 of the side walls, as illustrated in FIG. 2. The passenger pushes the bin, guided by the side walls, along the divesting table to a metering conveyor 38.

The metering conveyor 38, which may be a belt conveyor with a small-pitch, friction-top belt, such as an Intralox® Series 1100 FFT belt manufactured and sold by Intralox, L.L.C. of Harahan, La., U.S.A., receives one bin at a time from the divesting table 32. The metering conveyor feeds the bins to a checkpoint conveyor 40 that conveys the bins in a conveying direction 41 through the checkpoint, in this example, an x-ray scanning system 42. The metering conveyor and the checkpoint conveyor operate at different speeds. The speed of the metering conveyor belt sets the throughput rate. The higher speed of the checkpoint conveyor sets the gap between consecutive bins required by the scanning system.

After the loaded bins are scanned in the scanner 42, the checkpoint conveyor feeds them to a sorter 44 over its near side. The sorter selectively diverts the bins to one of two discharge lanes 46, 47 over its opposite side. Although only two discharge lanes are shown, a longer sorter could accommodate any number of lanes. If only one discharge lane is used, the sorter may be eliminated.

The sorter in this example uses an Intralox® Series 400 DARB belt 48 with Activated Roller Belt™ actuating rollers as described in U.S. Pat. No. 7,588,137, "Conveyor Belt Having Rollers that Displace Objects," Matthew L. Fourney, Sep. 15, 2009, incorporated into this description by reference. The sorter conveyor belt 48 advances in a travel direction 50 perpendicular to the main conveying direction 41. The sorter belt has pairs of stacked rollers 52 arranged to rotate on axes 54 oblique to the sorter belt's travel direction 50 and to the main conveying direction 41. When the belt rollers are actuated, the top, article-supporting rollers in each stack rotate in a direction 56 perpendicular to their axes of rotation. Then tangential velocity of the rotating belt roller in contact with the bottoms of the bins has a component equal and opposite to the speed of the sorter in the travel direction. The net velocity of the bins pushed by the activated rollers is directed laterally across the sorter. The net result is that the bins supported on actuated belt rollers move in the main conveying direction 41 to a selected discharge lane perpendicular to the belt's travel direction 50. When the belt rollers are not actuated, a bin is transported in the belt's travel direction 50 until the bin reaches the selected discharge lane. At that time, the roller-actuation system for that lane contacts the bottom rollers of the stack in the sorter belt in front of that lane to translate the bin onto the selected lane.

In the example system, two discharge lanes are shown: a cleared lane 46 and a suspect lane 47. Each lane comprises a bed 56 from which side rails 58 extend upward. The rails are spaced apart across the width of the bed a distance equal to the spacing between the corresponding wheels on the right and left sides of the bin. The rails have a flat top surface 60 on which the wheels 22 ride. The trough formed in each discharge lane is deep enough that the bottom panels of the bins do not contact the bed. The lanes are preferably tilted down but away from the scanner. In this way, the bins roll down the rails on the wheels aided by gravity. Except that the rails on the discharge lanes are taller and are tilted off horizontal, the discharge lanes are identical to the divesting table. The troughs may be made in modular sections 60 that can be cascaded to make longer discharge lanes or divesting tables.

The sorter 44 directs bins that pass the screening process to the cleared discharge lane 46 where the passenger may retrieve his belongings. Bins containing suspect articles are diverted off the sorter to the suspect discharge lane 47 where security personnel can scrutinize the contents more carefully. In the event of a system failure, the sorter could divert all bins to the suspect lane 47.

At the end of the cleared discharge lane, the bins are individually visioned by a visioning system 62. Two laser line projectors 64 mounted on a framework 66 above the end of the cleared discharge lane each shine a line 67 across the lane at the intersection of their beams 69 as a camera 68 mounted on the framework monitors the lane from above. Any articles remaining in the bins disrupt the laser beams and cause the line to fragment. The disruption is then detected by the cameras, and a stop 70, such as a pivoting or vertical stop, is actuated to block the non-empty bin from entering a bin inverter 72 at the start of a bin return 74.

The bin inverter 72 automatically guides empty bins 10 from the cleared discharge lane 46 through a 180° turn along a semicircular path from the end of the discharge lane to a horizontal conveyor 76 directly below the cleared lane 46. The bin inverter uses a pair of parallel curved tracks 78 that lead from the pair of parallel side rails 58 of the cleared discharge lane to a pair of parallel narrow conveyor belts 80 constituting the horizontal conveyor 76. The curved tracks, which may be made of U-shaped channel bent to form generally semicircular guides, receive the wheels of the bin from the cleared lane and guide the bin to the horizontal conveyor upside down. Any articles missed by the visioning system and remaining in the bin fall out as the bin is inverted and land on a pad 82 below the bin inverter to be retrieved by airport personnel.

A fixed stop 84 at the downstream end of the suspect discharge lane 47 blocks bins from falling off the end of the lane. If a visioning system is not used, the stop at the end of the cleared lane may be a fixed stop like the stop 84 at the end of the suspect lane or a slight bump to prevent the cleared bins from automatically entering the bin inverter. The slight bump is preferably as short as possible to make it easy to remove a bin from the lane but tall enough to stop the bin. The passenger or security personnel can manually load the bins into the bin inverter through flared, open distal ends 88 on a branch 86 of the guide tracks that receive the wheels 22 of bins 10 manually inserted into the bin inverter. In an all-manual inverter, the upper portion 89 of the guide tracks leading from the cleared discharge lane may be eliminated.

In the bin return, the bin wheels 22 sit atop the two conveyor belts 80, which advance below the cleared discharge lane 46 and the checkpoint 42 opposite the conveying direction 41 of the checkpoint conveyor 40. Thus, on the horizontal conveyor, the bins, supported on their wheels, are conveyed upside down back toward the divesting table.

An incline conveyor 90, such as a friction-top belt conveyor, lifts the bins from the level of the horizontal conveyor 76 up to the level of a pair of narrow conveyor belts 92 forming the vertical bin storage queue 30. Two rotating flappers 94 at the upper ends of side rails 96, when rotated clockwise to close the gap 98 between the incline conveyor and the bin storage belts, guide the leading portion of each bin onto the vertical bin storage queue. When the trailing end of the bin has cleared the incline conveyor, the flappers drop to the position shown in FIG. 7 to allow the trailing end of the bin to fall into a vertical position suspended by one pair of wheels from the parallel belts 92. The belts convey the vertically suspended bins directly below the divesting table 32 back to just in front of the start of the table where the bins may be removed by the passengers. Barriers 98 at end of the vertical bin storage conveyor block the bins from falling off the end. The bins accumulate in the queue with low back pressure because the wheels of the accumulated bins merely roll in place on the continuously running storage belts.

The automated portions of the checkpoint system, such as the visioning system, the automated stop, the flappers, the sorter, and the metering and checkpoint conveyors are controlled by a conventional controller, such as a programmable-logic controller, personal computer, work station computer, or other logic device.

Although the invention has been described with reference to a preferred version, one skilled in the art will recognize that many alternative versions may be made without departing from the invention as defined in the following claims.

What is claimed is:

1. A checkpoint system comprising:
   a checkpoint where articles are checked;
   a plurality of bins, each bin including:
      a bottom panel;

a front panel, a rear panel, a left panel, and a right panel upstanding from the bottom panel and forming four side walls extending upward to a top rim;

at least two wheels extending outward from each of the left and right panels, wherein the peripheries of the wheels do not extend below the bottom panel of the bin;

a divesting table atop which the bins, loaded with articles to be checked, are slid on their bottom panels toward the checkpoint;

a checkpoint conveyor for conveying the bins received from the divesting table through the checkpoint in a conveying direction;

at least one discharge lane receiving checked bins from the checkpoint conveyor and comprising a pair of parallel rails along which the wheels on the left and right panels of the bin ride.

2. A checkpoint system as in claim 1 wherein the divesting table includes parallel side walls spaced apart a distance sufficient to accommodate and guide the bins and form a trough shallow enough that the wheels of the bin do not contact the side walls.

3. A checkpoint system as in claim 1 wherein the at least one discharge lane further includes a bed along which the pair of parallel rails are mounted to form a trough deep enough that the bottoms of the bins are above the bed as the bins ride on their wheels along the rails.

4. A checkpoint system as in claim 1 wherein the at least one discharge lane tilts downward away from the checkpoint conveyor.

5. A checkpoint system as in claim 1 wherein the at least one discharge lane includes a first discharge lane and a second discharge lane and wherein the checkpoint system further comprises a sorter receiving checked bins from the checkpoint conveyor and selectively directing each checked bin to the first discharge lane or the second discharge lane.

6. A checkpoint system as in claim 5 wherein the sorter comprises a conveyor belt advancing perpendicular to the conveying direction and having stacked pairs of rollers rotatable on axes oblique to the conveying direction and selectively actuated to divert checked bins riding on the conveyor belts atop the stacked pairs of rollers across the conveyor belt to the first discharge lane or the second discharge lane.

7. A checkpoint system as in claim 1 further comprising a metering conveyor disposed between the divesting table and the checkpoint conveyor receiving bins to be checked from the divesting table and feeding the bins to the checkpoint conveyor, wherein the checkpoint conveyor conveys the bins in the conveying direction at a higher speed than the metering conveyor to provide gaps between consecutive bins.

8. A checkpoint system as in claim 1 further comprising a bin return conveying unloaded bins from the at least one discharge lane to the divesting table along a path below the checkpoint conveyor and the divesting table.

9. A checkpoint system as in claim 8 further comprising a visioning system at the downstream end of the at least one discharge lane for detecting loaded bins and preventing their entry into the bin return.

10. A checkpoint system as in claim 8 wherein the bin return includes a horizontal conveyor comprising a pair of parallel belts spaced horizontally apart to support the wheels on the left and right panels of the bins and convey the bins back toward the divesting table.

11. A checkpoint system as in claim 10 wherein the bins ride upside down along the horizontal conveyor.

12. A checkpoint system as in claim 10 further comprising a bin inverter including a pair of parallel curved tracks between the pair of parallel rails on the at least one discharge lane and the pair of parallel belts on the horizontal conveyor to guide and invert the bins going from the discharge lane to the bin return.

13. A checkpoint system as in claim 10 further comprising a bin inverter including a pair of parallel curved tracks extending from the pair of parallel belts of the horizontal conveyor to open ends for receiving the wheels of the bins and guiding the bins to the pair of parallel belts on the horizontal conveyor.

14. A checkpoint system as in claim 8 wherein the bin return further comprises a vertical bin storage queue comprising a pair of parallel belts spaced horizontally apart to support a single one of the at least two wheels on each of the left and right panels of the bins and convey the bins suspended vertically from the pair of parallel belts along the vertical bin storage queue.

15. A checkpoint system as in claim 14 wherein the bin return further includes a horizontal conveyor at a level below the level of the pair of parallel belts on the vertical bin storage system and an incline conveyor, wherein the horizontal conveyor receives the bins from the at least one discharge lane and conveys the bins horizontally to the incline conveyor to raise the bins for delivery to the vertical bin storage queue.

16. A checkpoint system as in claim 1 wherein the checkpoint is a scanning system.

17. A method for conveying flat-bottomed, wheeled bins through a checkpoint, comprising:
sliding bins holding articles to be checked on the flat bottoms of the bins along a table toward a checkpoint;
conveying the bins received from the table through the checkpoint where the articles in the bins are checked;
rolling the checked bins along a discharge lane formed by rails along which the wheels of the bins ride.

18. The method of claim 17 further comprising:
returning the checked bins to a storage queue below the table along a bin return below the rails and the checkpoint.

19. The method of claim 18 further comprising:
suspending the bins vertically from a pair of opposite bin wheels in the storage queue.

20. The method of claim 18 further comprising:
conveying the bins horizontally upside down along a portion of the bin return.

21. The method of claim 18 further comprising:
inverting the bins along a path between the discharge lane and the bin return below.

22. The method of claim 18 further comprising:
elevating the bins along the bin return before the bins reach the storage queue.

23. The method of claim 17 further comprising:
visioning the bins at the end of the discharge lane opposite the checkpoint to distinguish loaded bins from empty bins.

24. The method of claim 17 further comprising:
sorting checked bins and selectively diverting each of the bins to one of a plurality of discharge lanes.

25. The method of claim 17 further comprising:
metering the bins to form gaps between consecutive bins as they are conveyed through the checkpoint.

* * * * *